(12) United States Patent
Yang

(10) Patent No.: US 6,320,457 B1
(45) Date of Patent: Nov. 20, 2001

(54) HIGH LEVEL VOLTAGE GENERATOR

(75) Inventor: Sun Suk Yang, Kyoungki-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/603,050

(22) Filed: Jun. 26, 2000

(30) Foreign Application Priority Data

Jun. 29, 1999 (KR) .................................................. 99-25380

(51) Int. Cl.⁷ ...................................................... G05F 1/10
(52) U.S. Cl. .............................................................. 327/536
(58) Field of Search .................................. 327/530, 534, 327/535, 536

(56) References Cited

U.S. PATENT DOCUMENTS

| 5,337,284 | 8/1994 | Cordoba et al. | 365/227 |
| 5,453,959 | 9/1995 | Sakuta et al. | 365/222 |
| 5,511,026 | 4/1996 | Cleveland et al. | 365/189.09 |
| 5,687,128 | 11/1997 | Lee et al. | 365/226 |
| 5,767,735 | * 6/1998 | Javanifard et al. | 327/536 |
| 5,841,725 | 11/1998 | Kang et al. | 365/226 |
| 5,909,141 | * 6/1999 | Tomishima | 327/536 |
| 6,031,411 | * 2/2000 | Tsay et al. | 327/536 |
| 6,208,198 | * 3/2001 | Lee | 327/536 |

FOREIGN PATENT DOCUMENTS

| 02312095 | 12/1990 | (JP) . |
| 05342868 | 12/1993 | (JP) . |
| 07098982 | 4/1995 | (JP) . |

* cited by examiner

*Primary Examiner*—Jeffrey Zweizig
(74) *Attorney, Agent, or Firm*—Pillsbury Winthrop LLP

(57) ABSTRACT

A high level voltage generator, comprising: high voltage level detection means for comparing a potential level of a high voltage node and a target level to generate a first pumping enable control signal; first oscillation means for periodically generating a first pulse signal by the first pumping enable control signal from the high voltage level detection means; first high voltage pump means for pumping the potential level of the high voltage node by the first pulse signal from the first oscillation means; pumping drivability control means for detecting a length of an active time of the first pumping enable control signal to generate a second pumping enable control signal; second oscillation means for generating a second pulse signal by the second pumping enable control signal from the pumping drivablity control means; and second high voltage pump means for pumping the potential level of the high voltage node by the second pulse signal from the second oscillation means.

11 Claims, 5 Drawing Sheets

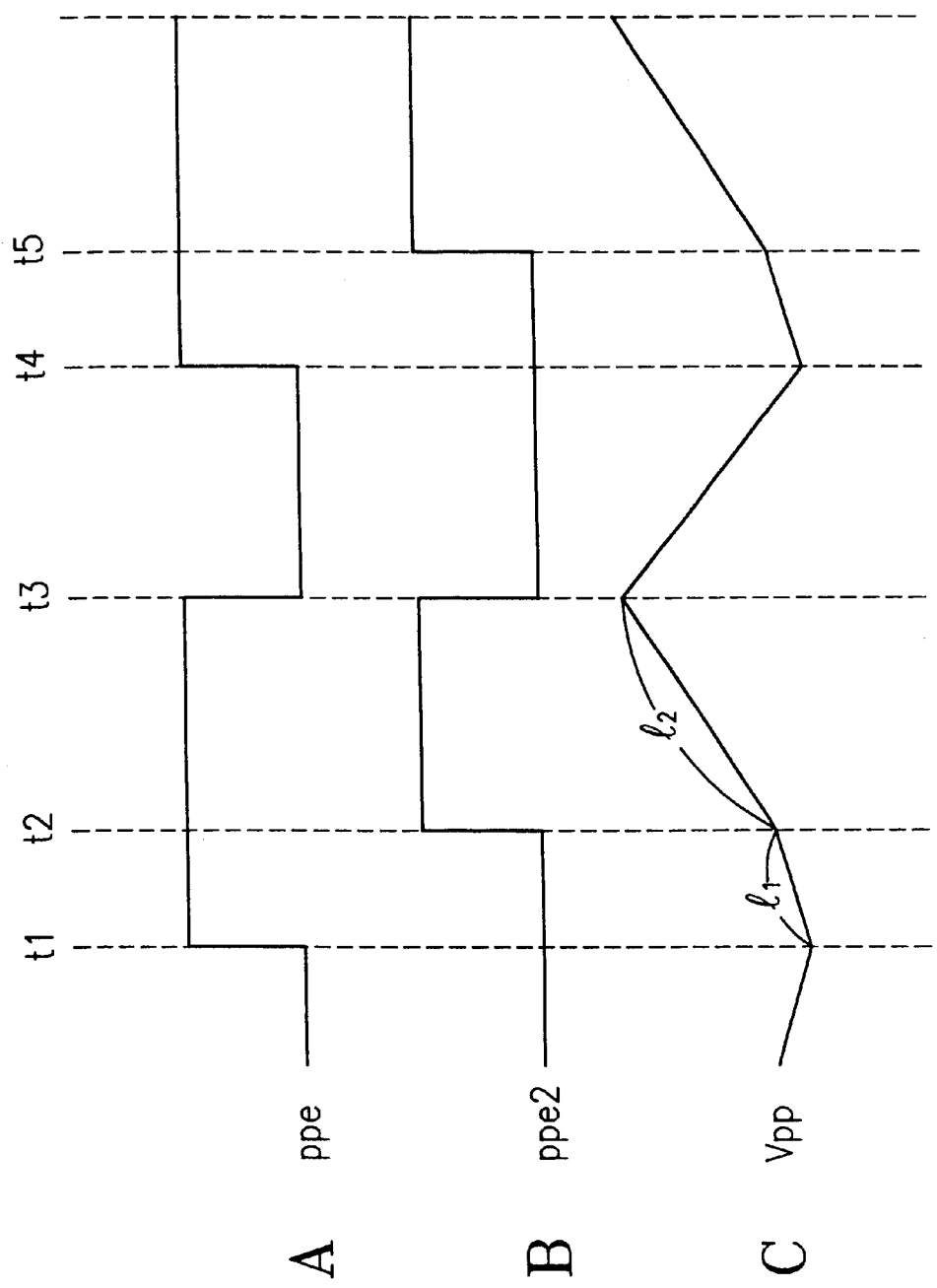

HIGH LEVEL VOLTAGE GENERATOR

BACKGROUND OF THE INVENTION

1. Field of the Invention

This invention relates to a high level voltage generator, and more particularly to a high level voltage generator for rapidly pumping a high voltage node by simultaneously driving two high voltage pumping circuit when the potential level of the high voltage node is largely dropped.

2. Description of the Related Art

In general, a semiconductor memory device such as DRAM is a random access memory which reads/writes data in/from a memory cell including a transistor and a capacitor. The read or write operation of the DRAM will be described as follows. First, a row address strobe signal /RAS becomes in an active state and then a word line is activated by a row address signal. Then a column address strobe signal /CAS becomes in an active state and a bit line is activated by a column address to select a memory cell. The data is read/written in/from the selected memory cell.

The DRAM uses a high level voltage Vpp having a higher level than the power supply Vcc considering the voltage loss due to a threshold voltage Vtn of the MOS transistor constituting the memory cell in driving a word line. The high level voltage Vpp is generated from a high level voltage generator for a word line which generates a potential of power supply Vcc+threshold voltage Vtn+ΔV.

FIG. 1 shows a conventional high level voltage generator. The high level voltage generator includes a high voltage level detection means 100 which detects a potential level of a high voltage node Vpp and compares the detected level with the target level to generate a pumping enable control signal ppe. The high level voltage generator includes a ring oscillator 200 for periodically generating a pulse signal by the pumping enable control signal ppe from the high voltage level detection means 100 in a power-up signal of active state and a high voltage pump means 300 for pumping the high voltage node to a high voltage level by the pulse signal from the ring oscillator 200. The high level voltage generator further includes a power-on precharging circuit (not shown) for initializing the potential level of the high voltage node Vpp to a constant voltage, before the high voltage pump means 300 operates.

The operation will be described as follows. First, in a power-up initial state, before the high voltage pump means 300 operates, if the potential level of the high voltage node Vpp is lower than an external voltage Vext, the power-on precharing circuit (not shown) initialize the high voltage node Vpp to a voltage which is lower than the external voltage Vext by a threshold voltage Vt of a MOS transistor. Thereafter, a power is supplied to a DRAM device, the substrate voltage pump circuit (not shown) operates and pumps the substrate voltage Vbb below a constant voltage. At this time, if the substrate voltage Vbb is below a constant voltage, the power-up signal is applied to the ring oscillator 200 to generate the pulse signal having a constant period.

The high voltage pump means 300 pumps the high voltage node Vpp to rise the potential level of the high voltage by the pulse signal from the ring oscillator 200. The high voltage level detector 100 detects whether the potential level of the high voltage node Vpp reaches to the target level. If the detected potential level of the high voltage node Vpp reaches to the target level, the high voltage level detection means 100 makes the ring oscillator 200 not to generate the pulse signal. Accordingly the high voltage pump means 300 does not more operate.

The high level voltage generator constantly establishes the pumping drivablity in the high voltage pump means 300. When the consumption of the high voltage is large, the pumping time becomes long. Otherwise, when the consumption of the high voltage is low, the pumping time becomes short. Therefore, so as to reduce the pumping time, if the high level voltage generator is designed to have the large drivability, the potential level of the high voltage node is rapidly recovered. However, during the required time that the high voltage level detection means 100 detects the potential level of the high voltage node Vpp to control the high voltage pump means 300, the high voltage pump means 300 continuously operates. Accordingly, the potential level of the high voltage node Vpp exceeds the initial target level.

Accordingly, so as to reduce the pumping time, if the prior high level voltage generator is designed to have the large drivablity in the high voltage pump means 300, the high voltage level is rapidly recovered. But the undesired current consumption becomes large and the noise caused. On the other hand, so as to reduce the current consumption and the noise, if the high level voltage generator is designed to have the low drivability in the high voltage pump means 300, the recovery time of the high voltage level becomes long and data in a memory cell becomes lost.

SUMMARY OF THE INVENTION

It is an object of the present invention to provide a high level voltage generator with increase of operation speed and reduction of current consumption by adjusting the drivability in a high voltage pump circuit in accordance with the potential level of the high voltage.

According to an aspect of the present invention, there is provided to a high level voltage generator, comprising: high voltage level detection means for comparing a potential level of a high voltage node and a target level to generate a first pumping enable control signal; first oscillation means for periodically generating a first pulse signal by the first pumping enable control signal from the high voltage level detection means; first high voltage pump means for pumping the potential level of the high voltage node by the first pulse signal from the first oscillation means; pumping drivability control means for detecting a length of an active time of the first pumping enable control signal to generate a second pumping enable control signal; second oscillation means for generating a second pulse signal by the second pumping enable control signal from the pumping drivablity control means; and second high voltage pump means for pumping the potential level of the high voltage node by the second pulse signal from the second oscillation means.

In the high level voltage generator, the pumping drivability control means includes a delay part for delaying the first pumping enable control signal from the high voltage level detection means for a constant time; and an AND logic part for carrying out AND logic operation of an output signal from the delay part and the first pumping enable control signal. The delay part includes an even number of inverters and the AND logic part includes a NAND gate and an inverter.

In the high level voltage generator, the first and second oscillation means are comprised of ring oscillators.

According to another aspect of the present invention, there is provided to a high level voltage generator, comprising: high voltage level detection means for comparing a potential level of a high voltage node and a target level to generate a first pumping enable control signal; oscillation means for periodically generating a pulse signal by the first pumping enable control signal from the high voltage level detection means; first high voltage pump means for pumping the potential level of the high voltage node by the pulse signal from the oscillation means; pumping drivability control means for detecting a length of an active time of the first pumping enable control signal to generate a second pumping enable control signal; pulse transfer means for transferring the pulse signal from the oscillation means by the second pumping enable control signal from the pumping drivablity control means; and second high voltage pump means for pumping the potential level of the high voltage node by the pulse signal transferred from the pulse transfer means.

In the high level voltage generator, the pumping drivability control means includes a delay part for delaying the first pumping enable control signal from the high voltage level detection means for a constant time; and an AND logic part for carrying out AND logic operation of an output signal from the delay part and the first pumping enable control signal from the high voltage level detection means. The delay part includes an even number of inverters and the AND logic part includes a NAND gate and an inverter.

In the high level voltage generator, the oscillation means is comprised of a ring oscillator.

In the high level voltage generator, the pulse transfer means includes a NAND gate for carrying out NAND logic operation of the second pumping enable control signal from the pumping drivability control means and the pulse signal from the oscillation means; and an inverter for inverting an output of the NAND gate.

BRIEF DESCRIPTION OF THE DRAWINGS

The objects and features of the invention may be understood with reference to the following detailed description of an illustrative embodiment of the invention, taken together with the accompanying drawings in which:

FIG. 5 is a timing diagram of the high level voltage generator in the present invention in FIGS. 2 and 3.

DETAILED DESCRIPTION OF THE INVENTION

Figure 1:
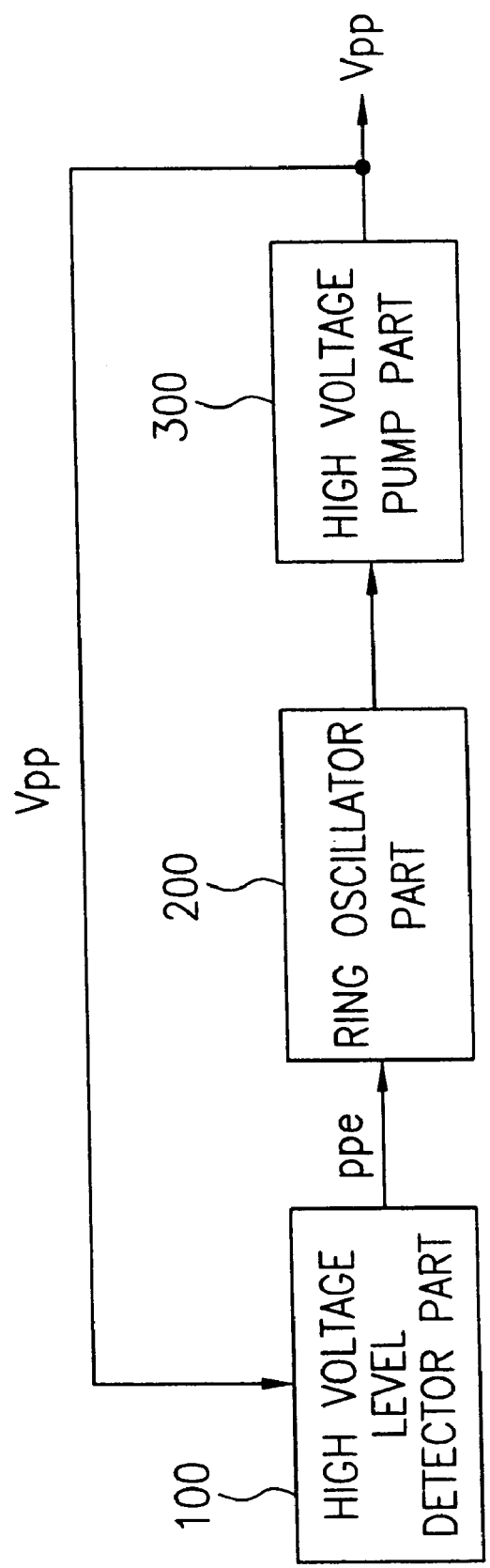
FIG. 1 is a block diagram of a conventional high level voltage generator.
Figure 2:
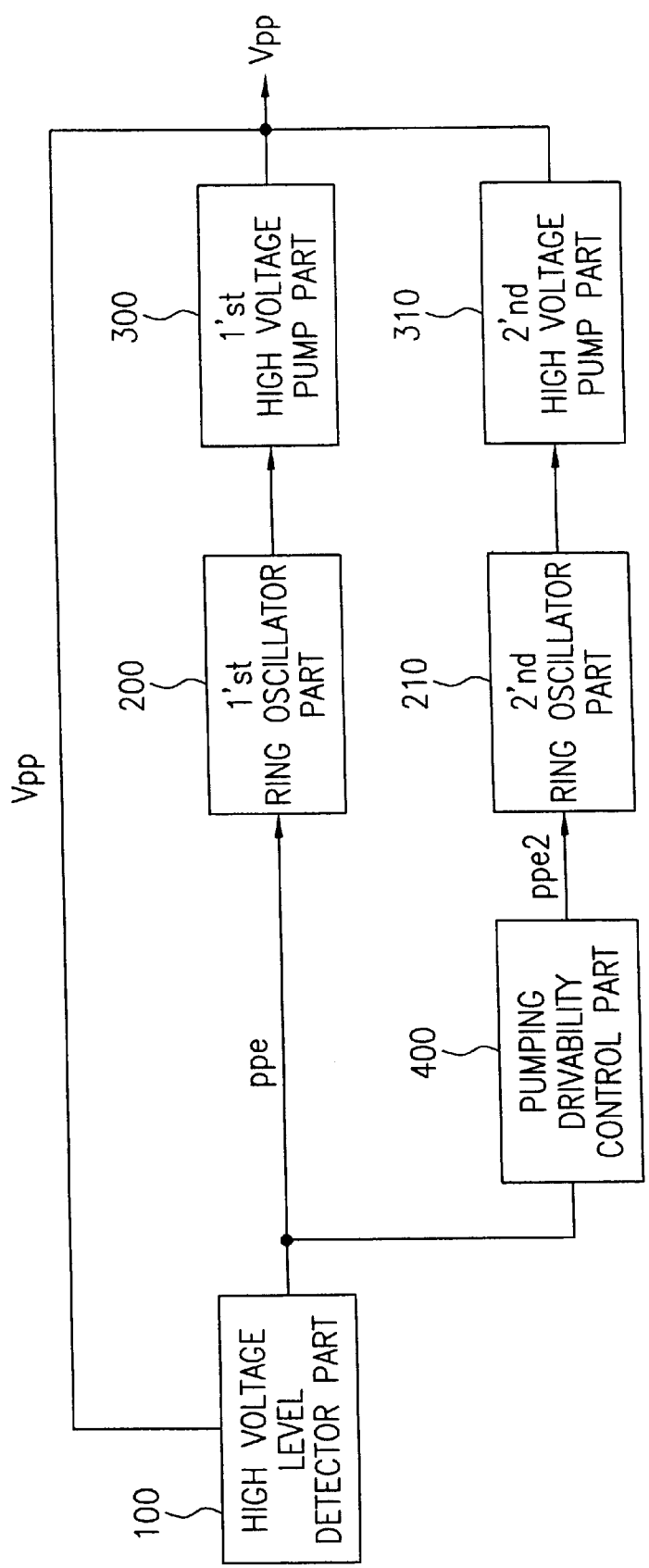
FIG. 2 is a circuit diagram of a high level voltage generator in accordance with one embodiment of the present invention.

FIG. 2 is a circuit diagram of a high level voltage generator in accordance with one embodiment of the present invention. The high level voltage generator includes high voltage level detection means 100 for comparing a potential level of a high voltage node Vpp and a target level to generate a first pumping enable control signal ppe; first oscillation means 200 for periodically generating a first pulse signal by the first pumping enable control signal ppe from the high voltage level detection means 100; first high voltage pump means 300 for pumping the potential level of the high voltage node Vpp by the first pulse signal from the first oscillation means 200.

The high level voltage generator further includes pumping drivability control means 400 for detecting a length of an active time of the first pumping enable control signal ppe to generate a second pumping enable control signal ppe2; second oscillation means 210 for generating a second pulse signal by the second pumping enable control signal ppe2 from the pumping drivablity control means 400; and second high voltage pump means 310 for pumping the potential level of the high voltage node Vpp by the second pulse signal from the second oscillation means 210.

The high level voltage generator detects the potential level of the high level node Vpp. If the detected potential level of the high voltage node Vpp is less than the reference value i.e. the target level, it determines that the consumption of a high voltage is large to simultaneously drive two high voltage pump means 300 and 310. If the detected potential level of the high voltage node Vpp is larger than the reference value, it determines that the consumption of the high voltage is small to drive only one high voltage pump means 300.

The pumping drivability control means 400 receives the first pumping enable control signal ppe from the high voltage level detection means 100 and compares the active time of the first pumping enable control signal ppe with the reference time to detect the potential level of the high voltage node Vpp. If the active time of the first pumping enable control signal ppe is longer than the reference time, it determines that the potential level of the high voltage node Vpp is very low. The pumping drivability control means 400 generates the second pumping enable control signal ppe2 for driving the second high voltage pump means 310 with the first high voltage pump means 300.

If the active time of the first pumping enable control signal ppe is shorter than the reference time, it determines that the potential level of the high voltage node Vpp is lightly low. The pumping drivability control means 400 generates the second pumping enable control signal ppe2 for making the second high voltage pumping means 310 not to drive.

Accordingly, the pumping drivability control means 400 determines the potential level of the high voltage node Vpp to control the operation of the second high voltage pump means 310 in accordance with the length of the active time of the first pumping enable control signal ppe from the high voltage level detection means 100. The high level voltage generator in FIG. 2 adjusts the drivability of the high voltage pump means to be large or small in accordance with the potential level of the high voltage node Vpp, thereby reducing the current consumption and improving the operation speed of the pumping means.

Figure 3:
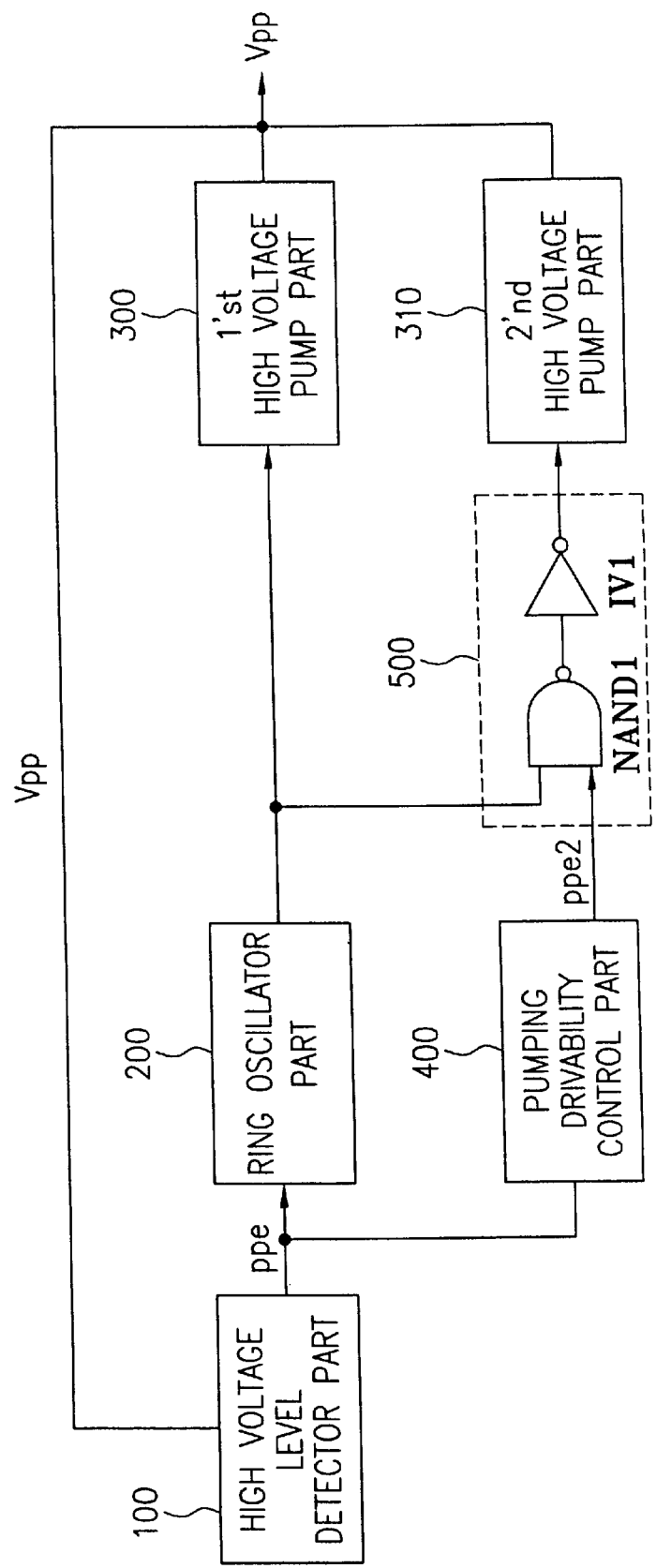
FIG. 3 is a circuit diagram of a high level voltage generator in accordance with another embodiment of the present invention.

FIG. 3 is a circuit diagram of a high level voltage generator in accordance with another embodiment of the present invention. The high level voltage generator of another embodiment includes high voltage level detection means 100 for comparing a potential level of a high voltage node Vpp and a target level to generate a first pumping enable control signal ppe; ring oscillator 200 for periodically generating a pulse signal by the first pumping enable control signal ppe from the high voltage level detection means 100; first high voltage pump means 300 for pumping the potential level of the high voltage node Vpp by the pulse signal ppe from the oscillation means 200.

The high level voltage generator further includes pumping drivability control means 400 for detecting the potential level of the high voltage node Vpp in accordance with the length of an active time of the first pumping enable control signal ppe to generate a second pumping enable control signal ppe2; pulse transfer means 500 for transferring the pulse signal from the ring oscillator 200 by the second pumping enable control signal ppe2 from the pumping drivablity control means 400; and second high voltage pump means 310 for pumping the potential level of the high voltage node Vpp by the pulse signal transferred from the pulse transfer means 500.

The pulse transfer means 500 includes a NAND gate NAND1 for receiving the second pumping enable control signal ppe2 from the pumping drivability control means 400 and the pulse signal from the ring oscillator 200 and an inverter IV1 for inverting an output signal from the NAND gate NAND1.

The high level voltage generator in another embodiment operates as that in one embodiment. First, it detects the potential level of the high level node Vpp through the high voltage level detection means 100. If the detected potential level of the high voltage node Vpp is less than the reference value i.e. the target level, it determines that the consumption of a high voltage is large to simultaneously drive two high voltage pump means 300 and 310. If the detected potential level of the high voltage node Vpp is larger than the reference value, it determines that the consumption of the high voltage is small to drive only one high voltage pump means 300.

However, the high level voltage generator in another embodiment is different from that in one embodiment in that only one ring oscillator is used to reduce the dimension of layout and the current consumption.

The operation of the high level voltage generator will be described in more detail as follows.

The potential level of the high voltage node Vpp is lower than the desired target level, the high voltage level detection means 100 detects the potential level of the high voltage node Vpp to generate the first pumping enable control signal ppe. The ring oscillator 200 operates by the first pumping enable control signal ppe from the high voltage level detection means 100 to generate the pulse signal. The first high voltage pump means 300 operates to pump the high voltage node Vpp.

As like one embodiment of FIG. 2, the pumping drivability control means 400 receives the first pumping enable control signal ppe from the high voltage level detection means 100 and compares the active time of the first pumping enable control signal ppe with the reference time. If the active time of the first pumping enable control signal ppe is longer than the reference time, it determines that the potential level of the high voltage node Vpp is very low. The pumping drivability control means 400 generates the second pumping enable control signal ppe2 for driving the second high voltage pump means 310 with the first high voltage pump means 300.

If the active time of the first pumping enable control signal ppe is shorter than the reference time, it determines that the potential level of the high voltage node Vpp is lightly low. The pumping drivability control means 400 generates the second pumping enable control signal ppe2 for making the second high voltage pumping means 310 not to drive.

The pulse transfer means 500 receives the second pumping enable control signal ppe2 from the pumping drivability control means 400 and the pulse signal from the ring oscillator 200 and transfers the pulse signal from the ring oscillator 200 to the second high voltage pump means 310 in the active state of the second pumping enable control signal ppe2, Therefore, the second high voltage pump means 310 operates.

Accordingly, the high level voltage generator in FIG. 3 controls two high voltage pump means 300 and 310 to drive, thereby reducing the current consumption and improving the operation speed of the pumping means, if the potential level of the high voltage node Vpp is lower than the target level.

Figure 4:
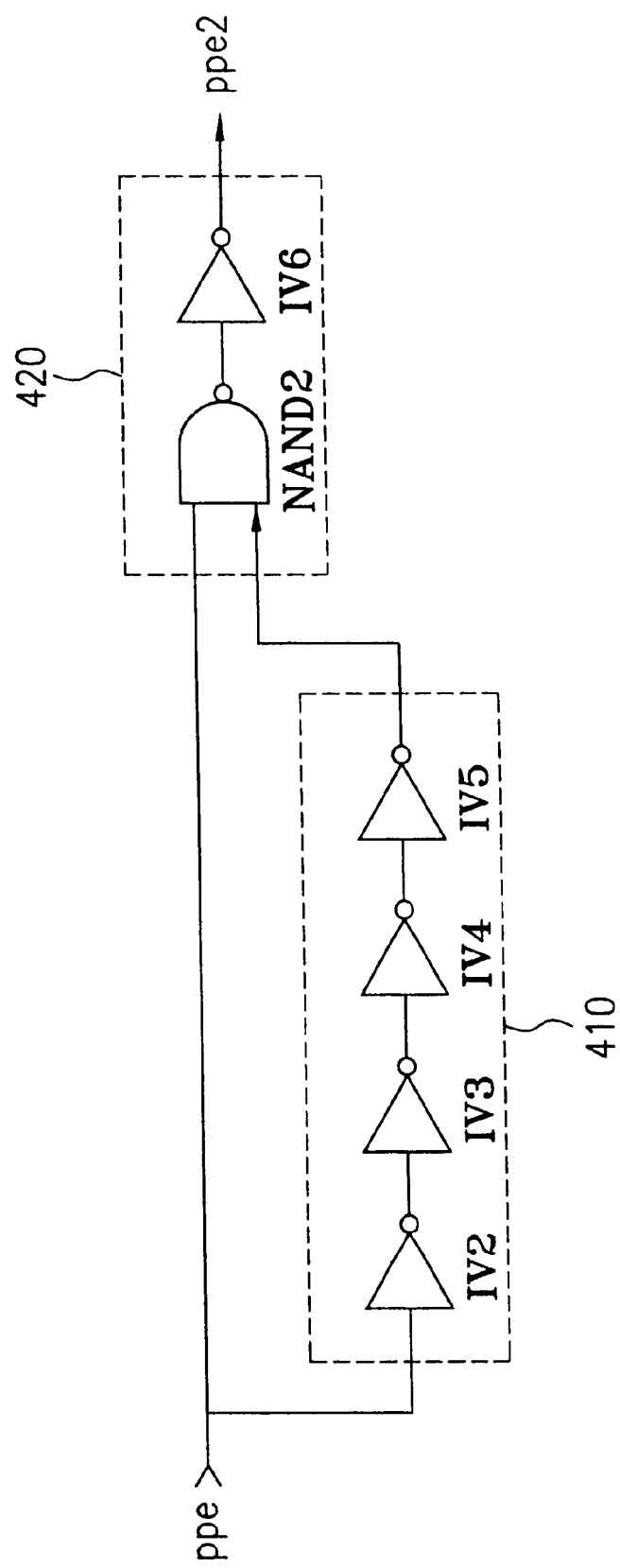
FIG. 4 is a circuit diagram of pumping drivability control means in the high level voltage generator of the present invention in FIGS. 2 and 3.

FIG. 4 is a circuit diagram of the pumping drivability control means 400 in the high level voltage generator of the embodiment in FIGS. 2 and 3. The pumping derivability control means 400 includes a delay part 410 for delaying the first pump enable control signal ppe from the high voltage level detection means 100 for a constant time and a logic part 420 for carrying out the AND logic operation of an output signal from the delay part 410 and the first pumping enable control signal ppe. The delay part 410 is comprised of an even number of inverters connected in series, for example 4 inverters IV2–IV5 and the logic part 420 and a NAND gate NAND2 for receiving an output signal of the delay part 410 and the first pumping enable control signal ppe and an inverter IN6 for inverting an output signal of the NAND gate NAND2.

The operation of the pumping drivability control means 400 will be described as follows with reference to FIG. 5. First, suppose that the first pumping enable control signal ppe as a pulse signal shown in FIG. 5A is provided to the pumping drivability control means 400. If the active time of the first pumping enable control signal ppe from the pumping drivability control means 400 is longer than the delay time t1–t2 delayed through the delay part 410, the pumping drivability control means 400 generates the second pumping enable control signal ppe2 which is activated from the delay time t1–t2 in the delay part 410 to the time that the first pumping enable control signal ppe is inactivated.

If the second pumping enable control signal ppe2 is generated from the pumping drivability control means 400, the high level voltage generator of FIG. 2 operates the second ring oscillator 210 so as to drive the second high voltage pump means 310. The high level voltage generator in FIG. 3 transfers the pulse signal from the ring oscillator 200 to the second high voltage pump means 310 to drive through the pulse transfer means 500.

Accordingly, if the potential level of the high voltage node Vpp is lower than the target level, the first and second high voltage pump means 300 and 310 simultaneously operate during the interval between the times t2–t3 of FIG. 5C to improve the high voltage pumping drivability . As shown in FIG. 5C, it is noted that the potential level of the high voltage node Vpp which is generated in the time interval t2–t3 that the first and second high voltage pump means 300 and 310 simultaneously operate is very remarkably improved as compared with that which is generated in the time interval t1–t2 that only the first high voltage pump means 300 operates through the gradient difference of signal waveform (the gradient of 12> the gradient of 11).

According to the present invention, the high level voltage generator adjust the pumping drivability in accordance with the potential level of the high voltage node Vpp, thereby rapidly pumping the potential level of the high voltage node to a desired level and reducing the current consumption and the noise.

While the invention has been particularly shown and described with respect to preferred embodiment thereof, it will be understood by those skilled in the art that various changes in form and details may be made therein without departing from the spirit and the scope of the invention as defined by the following claims.

What is claimed is:

1. A high level voltage generator, comprising:

high voltage level detection means for comparing a potential level of a high voltage node and a target level to generate a first pumping enable control signal;

first oscillation means for periodically generating a first pulse signal by the first pumping enable control signal from the high voltage level detection means;

first high voltage pump means for pumping the potential level of the high voltage node by the first pulse signal from the first oscillation means;

pumping drivability control means for detecting a length of an active time of the first pumping enable control signal to generate a second pumping enable control signal;

second oscillation means for generating a second pulse signal by the second pumping enable control signal from the pumping drivablity control means; and second high voltage pump means for pumping the potential level of the high voltage node by the second pulse signal from the second oscillation means.

2. The high level voltage generator as claimed in claim 1, wherein the pumping drivability control means includes:

a delay part for delaying the first pumping enable control signal from the high voltage level detection means for a constant time; and an AND logic part for carrying out AND logic operation of an output signal from the delay part and the first pumping enable control signal.

3. The high level voltage generator as claimed in claim 2, wherein the delay part includes an even number of inverters.

4. The high level voltage generator as claimed in claim 2, wherein the AND logic part includes a NAND gate and an inverter.

5. The high level voltage generator as claimed in claim 1, wherein the first and second oscillation means are comprised of ring oscillators.

6. A high level voltage generator, comprising:

high voltage level detection means for comparing a potential level of a high voltage node and a target level to generate a first pumping enable control signal;

oscillation means for periodically generating a pulse signal by the first pumping enable control signal from the high voltage level detection means;

first high voltage pump means for pumping the potential level of the high voltage node by the pulse signal from the oscillation means;

pumping drivability control means for detecting a length of an active time of the first pumping enable control signal to generate a second pumping enable control signal;

pulse transfer means for transferring the pulse signal from the oscillation means by the second pumping enable control signal from the pumping drivablity control means; and second high voltage pump means for pumping the potential level of the high voltage node by the pulse signal transferred from the pulse transfer means.

7. The high level voltage generator as claimed in claim 6, wherein the pulse transfer means includes:

a NAND gate for carrying out NAND logic operation of the second pumping enable control signal from the pumping drivability control means and the pulse signal from the oscillation means; and an inverter for inverting an output of the NAND gate.

8. The high level voltage generator as claimed in claim 6, wherein the pumping drivability control means includes:

a delay part for delaying the first pumping enable control signal from the pumping drivability control means for a constant time; and an AND logic part for carrying out logic operation of an output signal from the delay part and the first pumping enable control signal.

9. The high level voltage generator as claimed in claim 8, wherein the delay part includes an even number of inverters.

10. The high level voltage generator as claimed in claim 8, wherein the AND logic part includes a NAND gate and an inverter.

11. The high level voltage generator as claimed in claim 6, wherein the oscillation means is comprised of a ring oscillator.

* * * * *